United States Patent [19]

Stumpf et al.

[11] Patent Number: 5,175,829
[45] Date of Patent: Dec. 29, 1992

[54] METHOD AND APPARATUS FOR BUS LOCK DURING ATOMIC COMPUTER OPERATIONS

[75] Inventors: Bernard Stumpf, Chelmsford, Mass.; George M. Stabler, Nashua, N.H.; Richard G. Bahr, Cambridge, Mass.; Stephen J. Ciavaglia, Nashua, N.H.; Barry J. Flahive, Westford; Hugh Lauer, Concord, both of Mass.

[73] Assignee: Hewlett-Packard Company, Palo Alto, Calif.

[21] Appl. No.: 262,495

[22] Filed: Oct. 25, 1988

[51] Int. Cl.⁵ .................... G06F 9/00; G06F 13/00
[52] U.S. Cl. .................... 395/375; 364/228.3; 364/240; 364/262.4; 364/262.8; 364/281.5; 364/DIG. 1
[58] Field of Search ... 364/200 MS File, 900 MS File; 395/375, 775

[56] References Cited

U.S. PATENT DOCUMENTS

| | | | |
|---|---|---|---|
| 4,000,485 | 12/1976 | Barlow et al. | 364/200 |
| 4,245,299 | 1/1981 | Woods et al. | 364/200 |
| 4,402,046 | 8/1983 | Cox et al. | 364/200 |
| 4,488,217 | 12/1984 | Binder et al. | 364/200 |
| 4,574,350 | 3/1986 | Starr | 364/200 |
| 4,847,754 | 7/1989 | Obermarck et al. | 364/200 |

FOREIGN PATENT DOCUMENTS

A30130593 1/1985 European Pat. Off.
2044499A 10/1980 United Kingdom.
2188177A 9/1987 United Kingdom.

OTHER PUBLICATIONS

VAX Architecture Handbook, © 1981 Digital Equipment Corporation, pp. 24-27; 160-161; 194-195; 240-24249; 266.
Motorola MC68020 32-Bit Microprocessor User's Manual Second Edition, © 1985, 1984 Motorola, Inc.; pp. B-54, B-55 and B-163.

Primary Examiner—Thomas C. Lee
Assistant Examiner—Ayni Mohamed

[57] ABSTRACT

A computer system having a plurality of processors sharing common memory and data bus structures and operable to perform atomic operations which comprise several instruction actions, wherein the processor performing the atomic operation prevents memory access interruptions by other processors by locking out other processors during the atomic operation. The system bus includes signal paths accommodating bus lock request and bus lock signals which are provided and received by each processor, which signals are initiated by specific bus lock and lock release instructions added to each processor instruction set.

9 Claims, 2 Drawing Sheets

* IF CODE NOT RESIDENT IN PAGE EXCEPTION DECLARED, SERVICED OPERATION RESTARTED

METHOD AND APPARATUS FOR BUS LOCK DURING ATOMIC COMPUTER OPERATIONS

FIELD OF INVENTION

The present invention relates to multiple processor computing systems having system control locks preventing access during selected operations.

BACKGROUND OF THE INVENTION

A multiprocessor system requires a manner of granting, to one process/processor pair at a time, exclusive access to protected resources during selected operations which must not be interrupted, called atomic operations. Upon this primitive notion, much more elaborate interprocess control and communication mechanisms can be built. Most typically, the protected resources will be memory data structures such as process control blocks or synchronization semaphores or queues.

The most common approach to supporting such a facility in a computer instruction set is to define one or more instructions to have two indivisible actions of which one is conditioned upon the other. The TEST_AND_SET instruction and the COMPARE_AND_SWAP instructions of the Motorola 68020 instruction set typify this type of approach. These are actions so very primitive that another layer of more capable primitives must immediately be added, such as list entry ENQUEUE or process NOTIFY. In the context of a Reduced Instruction Set Computer (RISC) processor architecture, there is yet another important disadvantage, wherein this type of primitive will typically be multicycle and rather elaborate to implement.

SUMMARY OF THE INVENTION

Atomic operations are implemented by a sequence of instructions. To guarantee that the instruction sequence will complete, the memory subsystem and bus provide three special operations: load lock, store unlock, and load unlock. All three accept a memory address and correspond directly to single instructions. A fourth instruction, the probe, is also provided. While the lock is held, arbitrary read and write operations are permitted to any physical location by any one processor controlling the bus for the specific lock asserted. In particular, code sequences are possible to atomically update several locations in concert, e.g., adding or removing an item from a queue.

BRIEF DESCRIPTION OF THE DRAWING

In other embodiments, these and other factors of the present invention will be better understood by reading the following detailed description of the invention, taken together with the drawing, wherein.

DETAILED DESCRIPTION OF THE INVENTION

Figure 1:
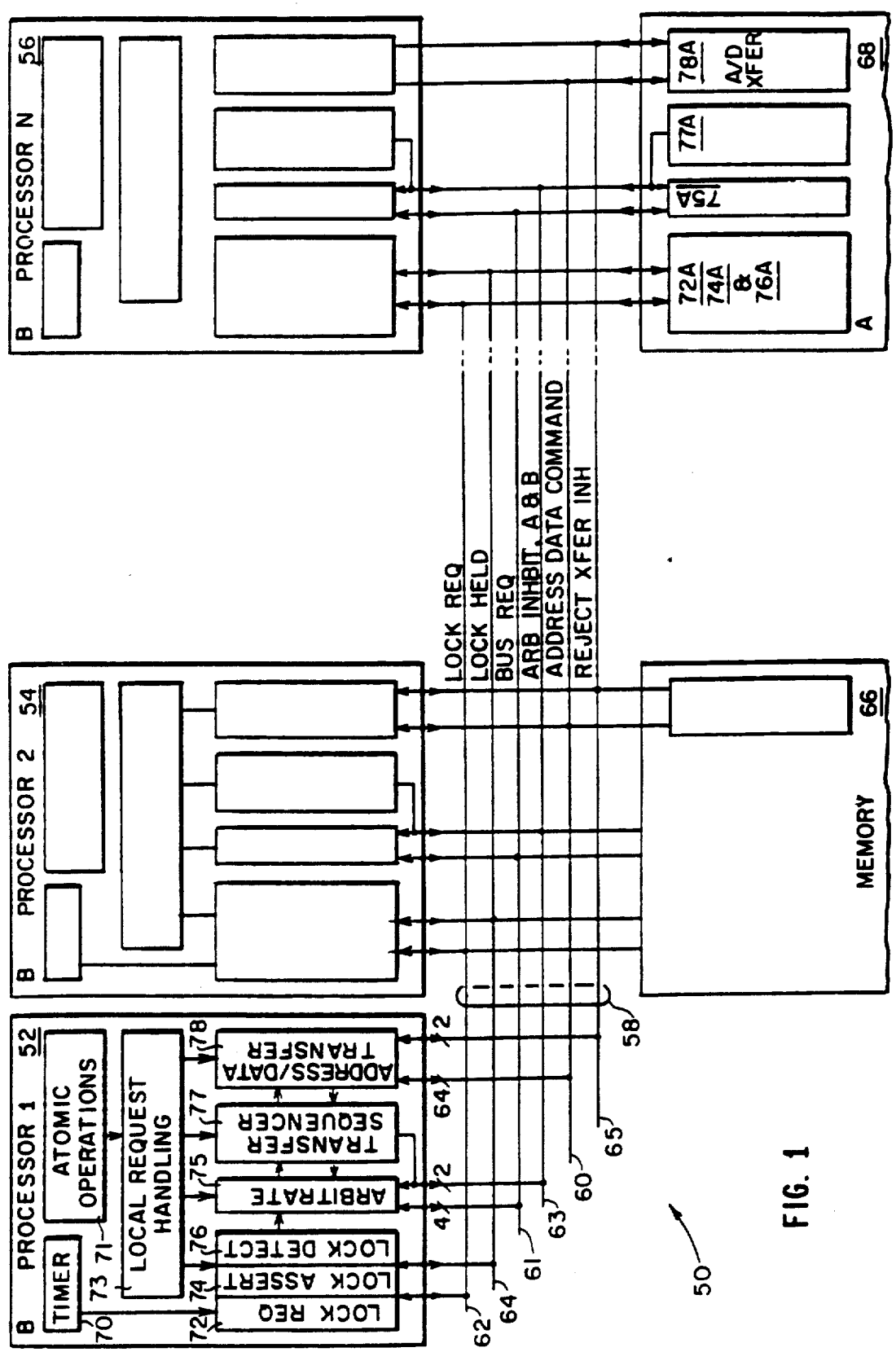
FIG. 1 is a block diagram of a multiprocessor system embodying the present invention.

A typical multiprocessor system having a plurality of processors embodying the present invention is shown in the block diagram 50 in FIG. 1. The elements in the processors 52, 54, and 56 relating to the present invention are substantially identical and relate to the interconnection of the processors 52, 54, and 56 to the common bus. The bus 58 includes address and data lines 60, the bus request line 61 and the lock held line 64, lock request line 62, arbitrate inhibit A and B 63, and request transfer inhibit 65. The primary aspect of the present invention relates to the communication of one of the processors 52, 54, 56 to a particular system resource, such as a memory 66. However, other embodiments are contemplated wherein such secure communications are provided between the processors themselves or other system hardware, not shown.

According to the present invention, there exists a sequence of operations which may not be interrupted by interrupts or time-shared access by other processors, wherein such a sequence of operations are known as atomic operations. When such atomic operations involve a single processor itself or a communication path which is not shared, the atomic operation does not require a bus lock. However, as exemplified by a transfer between the processor 52 and the memory 66, the access to the protected portions of memory 66 must be secured and limited to the processor 52. The instructions which trigger the processor 52 to cause the lock to occur typically includes at least one of a memory load lock instruction and either the memory store unlock or memory load unlock causes the locked access to the requested element, such as the memory 66, to be removed. A further instruction, a memory probe instruction functions as a memory write in all aspects except that the data is not written into the particular designated location. The memory probe instruction functions as a test to determine whether or not the addressed location is available for modification.

When a memory lock is initiated by a particular instruction, such as a memory load lock instruction, the processor 52 causes a lock detector 76 to determine if there exists a prior lock held signal on bus line 64. If so, the processor 52 is inhibited. If not, the processor 52 arbitrates for control of the bus according to arbitration techniques including those known in the art. If the processor 52 secures the right to drive the bus 58, the lock assert logic 74 will provide the lock signal on lock held line 64 simultaneous with the address/data transfer logic 78 driving the request address 60. Upon activation of the lock assert (also called lock held) signal from the bus assert logic 74, processor 52 has now blocked the access to the bus and, therefore to memory 64, excluding other processors 54 and 56 from access to the memory 64. The processor 52, having secured a bus lock condition activates the data transfer logic 78 to begin the data transfer between the processor 52 and memory 64. When the atomic operation is completed, the bus assert signal is removed, and the lock condition is terminated. Further discussion of methods and apparatus of multiple processor interlocks is provided in APOLL-111XX, entitled MULTIPROCESSOR INTERLOCK, filed concurrently herewith and incorporated by reference. If while arbitrating for the bus another processor wins and asserts lock, the requesting processor will stop requesting in the embodiment shown. There is normally no prior indication that a processor wants a lock until it acquires it. But, if another processor already holds the lock, the second processor will assert a lock request to inform the other processor of the lock interest so a fairness algorithm can be implemented.

Figure 2:
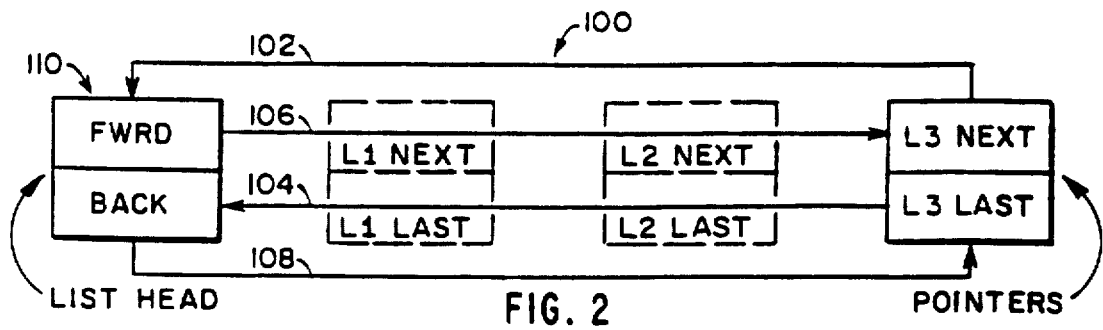
FIG. 2 is a block diagram of a linked list structure whose modification involves an atomic operation.

A doubly-linked list structure 100 shown in FIG. 2 involves the connection of forward 102 and 104 vectors and backward 106 and 108 vectors connecting elements in a doubly-linked list, 100 wherein the insertion of a list element L1, L2, or L3 which is connected to the head 110. In the event that the list is empty, containing no element, a list head 110 remains providing the reference location of the list 100.

Figure 3:
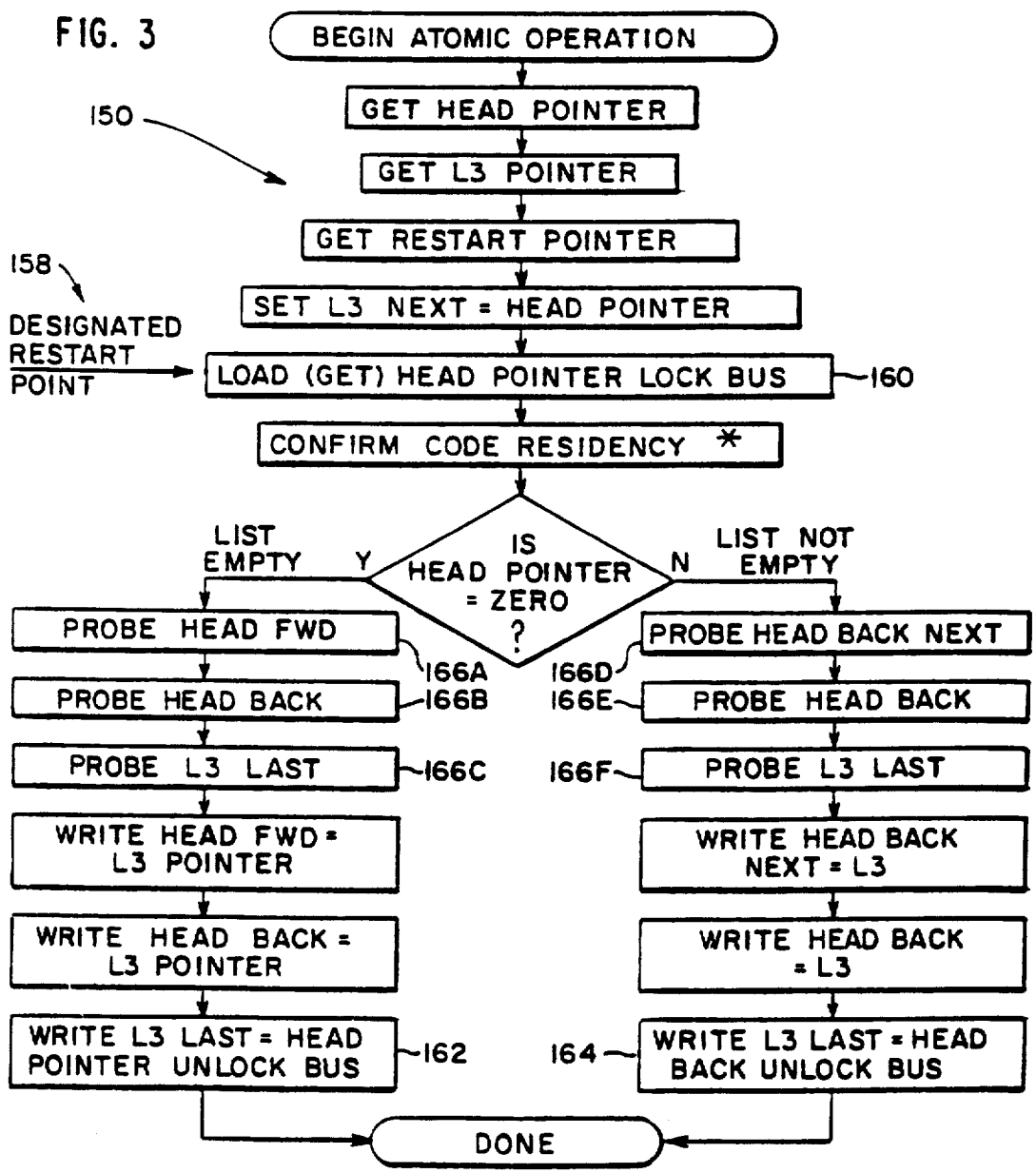
FIG. 3 is a flow chart of an exemplary atomic operation having a lock and an unlock instruction according to form the software structure of FIG. 2.

The formation of the most elementary list, that is containing a single element such as element L3 according to a list forming operation shown in the flow chart 150 of FIG. 3. The flow chart 150 illustrates an atomic operation wherein the forward and rearward pointing vectors 102-108 are established. The load lock instruction 160 causes the bus lock to be initiated. The concluding store instructions 162 or 164 cause the bus to be unlocked before resuming the program sequence.

The load lock must override any data caching and go directly to memory, since it is only at the system bus that arbitration and lock acquisition among multiple processors takes place. If the lock is not yet secured, the lock is then taken and the load is allowed to complete. Otherwise, the load is stalled until such time as the lock may be acquired.

The store unlock or load unlock must also bypass the cache (not shown) and release any lock only after securing the system bus and being assured either that the affiliated memory operation will certainly succeed or certainly fail. In cache based system implementations, any memory state modifications that have occurred while a lock was held must be visible to the next processor to secure the lock. In a write-through cache system, this is provided by having the unlock operation push ahead of itself any reads or writes that have been posted by instructions before the unlock instruction itself. In addition, the cache validity checking method of the other processors must assure that those flushed writes will have been observed by the next processor to acquire the lock when it succeeds at doing so. This is done by having the load lock force the processing of any pending cache invalidates or it may be intrinsic in the delays of the local invalidate processing pipeline compared to that of the load lock completion pipeline. In alternate embodiments including a write-back cache system, there are additional burdens to making this guarantee. One approach to making the state modifications visible to the other processors is that during the interval when a lock is held, all stores should trigger write data misses.

Lock timeout is to be used to ward against system deadlock caused by locked code sequences going awry. This implementation relies upon a lock duration timer 70 in the lock owning processor that monitors how long a lock is uninterruptably held. The timer value is set to a number that is large compared to expected lock holding duration. If the timer expires, the lock is automatically released and the violating processor is interrupted. An alternative timer approach is to equip the lock requesting process with a lock acquisition timer. This requires a somewhat larger timer value relates to the number of processors in the system, and the ability for one processor to forcibly grab the lock from another's possession.

In the single lock embodiment shown, the attempt to acquire a second lock while a first one is held will result in a program exception. Alternate embodiments include hardware which supports the proper stacking of lock and unlock instructions and the ability to recover from this stack if sequential program flow is disrupted.

To help assure finite progress through locked instruction sequences, events that are unrelated to instruction execution are not allowed to disrupt sequential program flow. For this reason, interrupts and other instruction asynchronous exceptions are inhibited while a lock is held.

A complication occurs when an instruction related exception occurs while a process is holding a lock. Exception handling is discussed in more detail in U.S. Ser. No. 07/259,793, now abandoned, filed Oct. 17, 1988, entitled METHOD AND APPARATUS FOR EXCEPTION HANDLING IN PIPELINE PROCESSORS HAVING MISMATCHED INSTRUCTION PIPELINES, incorporated by reference. A convention has therefore been established that a designated processor register will contain a "restart point 158" (an alternative return point at the start of the interlocked sequence) should the interlocked sequence fail to complete. The processor hardware typically is equipped with a state flag (not shown) to indicate if the current exception was taken while a lock was held. This state flag is set as soon as a load lock instruction is encountered, and it is cleared only when an unlock instruction has been guaranteed to complete. The state flag is available in the processor's program status word and is used by the exception handling software to elect the alternative return point. As a matter of convenience, an exception triggered while a lock is held automatically releases the affiliated lock or locks. As a matter of convenience, the exception return sequence always clears the lock held processor state. The locked code sequence may confirm that there will be an instruction page fault by touching, at page size intervals, the instruction stream that must be executed. Typically, this will require no more than loading the instruction at the end of the code sequence. The locked code can confirm there will be no store protection, violation or store pagefault by simply "touching" all the data it will need in executing the load instructions. For this purpose, the instruction set provides a probe instruction (166A-F) which confirms write access privilege and underlying page validity without actually writing to memory. The locked code sequence should then probe all memory locations it interrogates before updating even the first. Most types of instruction related exceptions other than these should not occur in locked code sequences; if they do occur, the process cannot be recovered. Typical of this type of unrecoverable locked code exceptions instruction are data misalignment and privileged instruction violation.

Modifications and substitutions of the present invention by one of ordinary skill in the art are considered to be within the scope of the present invention, which is not to be limited except by the claims which follow.

What is claimed is:

1. A computer system, comprising:
   a data bus including a control signal path;
   a system resource in communication with said data bus;
   a plurality of processor units each including:
   a bus control lock assert means connected to said control path for providing a bus lock signal thereon indicating control of said data bus;
   means responsive to processor operations connected to said bus lock assert means to acquire bus control; and a set of instructions for execution by said processor, said set of instructions, comprising:

a load lock instruction to lock said resource;

a store unlock instruction to write said resource and unlock said resource;

a load unlock instruction to unlock said resource and;

a probe instruction to test said resource for modification, said set of instructions being executed by said processor to produce atomic operations, said load lock instruction being executed by said processor so that said bus control lock assert means provides a lock signal on said data bus to permit said processor to have uninterruptable bus access, and one of said store unlock and said load unlock instructions being executed by said processor to de-assert said bus control lock means, and said probe instruction being executed to test a memory address's availability for modification.

2. The system of claim 1 wherein said atomic operation begins with said load lock instruction.

3. The system of claim 2 wherein said atomic operation ends with said load unlock instruction.

4. The system of claim 2 wherein said atomic operation ends with said store unlock instruction.

5. The system of claim 1 further comprising a lock timer for measuring the amount of time said system resource has been uninterruptedly locked.

6. The system of claim 5 further comprising a releasing means for releasing a lock on a resource that has been uninterruptedly locked for more than a predetermined amount of time.

7. The system of claim 1 wherein said processor generates an exception if a second lock instruction is executed by the processor while said system resource is locked by the processor.

8. The system of claim 7 wherein said exception results in immediate unlocking of the resource.

9. The system of claim 1 further comprising a processor register which contains a pointer to an instruction which is to be executed if an atomic operation fails to complete.

* * * * *